(12) United States Patent
Yashiki et al.

(10) Patent No.: US 9,071,697 B2
(45) Date of Patent: Jun. 30, 2015

(54) SCANNER SYSTEM

(71) Applicant: PFU Limited, Kahoku-shi, Ishikawa (JP)

(72) Inventors: Mitsuhiro Yashiki, Ishikawa (JP); Yuki Matsuda, Ishikawa (JP); Kayo Iimuro, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 14/103,777

(22) Filed: Dec. 11, 2013

(65) Prior Publication Data

US 2014/0099995 A1 Apr. 10, 2014

Related U.S. Application Data

(63) Continuation of application No. PCT/JP2011/063723, filed on Jun. 15, 2011.

(51) Int. Cl.
  *H04B 1/38* (2006.01)
  *H04M 1/725* (2006.01)
  *H04N 1/00* (2006.01)
  (Continued)

(52) U.S. Cl.
  CPC ....... *H04M 1/72527* (2013.01); *H04N 1/00204* (2013.01); *H04N 2201/0036* (2013.01); *H04N 2201/0058* (2013.01); *H04N 2201/0081* (2013.01); *H04N 2201/001* (2013.01); *H04M 1/04* (2013.01); *H04M 1/21* (2013.01)

(58) Field of Classification Search
  USPC ............. 455/557, 95, 11.1; 710/8, 62, 64, 72; 705/55; 715/200
  See application file for complete search history.

(56) References Cited

U.S. PATENT DOCUMENTS

| | | | |
|---|---|---|---|
| 6,192,257 B1 * | 2/2001 | Ray | 455/566 |
| 6,321,094 B1 * | 11/2001 | Hayashi et al. | 455/517 |
| 7,038,801 B2 | 5/2006 | Kurozasa et al. | |

(Continued)

FOREIGN PATENT DOCUMENTS

| | | |
|---|---|---|
| CN | 1921655 A | 2/2007 |
| JP | 6-068232 A | 3/1994 |

(Continued)

OTHER PUBLICATIONS

Japanese Office Action issued in Japanese Application No. 2013-520368 dated May 7, 2014, w/English translation.

(Continued)

*Primary Examiner* — Khalid Shaheed
(74) *Attorney, Agent, or Firm* — McDermott Will & Emery LLP

(57) ABSTRACT

In a scanner system comprising a portable terminal and a scanner device, the scanner device has a mounting portion on which the portable terminal is mounted and electrically connected to the scanner device. The scanner device acquires identification information of the portable terminal when the scanner device detects mounting of the portable terminal on the mounting portion, and transmits a connection request to the portable terminal having the identification information. The portable terminal activates an application for establishing communication with the scanner device in response to the connection request from the scanner device when the mounting of the portable terminal on the mounting portion is detected. Thus, the communication between the portable terminal and the scanner device can be established without operation of a user.

3 Claims, 5 Drawing Sheets

(51) Int. Cl.
*H04M 1/04* (2006.01)
*H04M 1/21* (2006.01)

(56) References Cited

U.S. PATENT DOCUMENTS

| | | | | |
|---|---|---|---|---|
| 7,899,494 | B2* | 3/2011 | Lee et al. | 455/557 |
| 2004/0029526 | A1 | 2/2004 | Miki et al. | |
| 2010/0214629 | A1* | 8/2010 | Patterson | 358/474 |
| 2011/0063645 | A1 | 3/2011 | Sugino | |
| 2012/0099162 | A1* | 4/2012 | Murosaki | 358/474 |

FOREIGN PATENT DOCUMENTS

| | | |
|---|---|---|
| JP | 10-083146 A | 3/1998 |
| JP | 2002-084348 A | 3/2002 |
| JP | 2002-261900 A | 9/2002 |
| JP | 2003-271856 A | 9/2003 |
| JP | 2004-015449 A | 1/2004 |
| JP | 2004-072636 A | 3/2004 |
| JP | 2006-186418 A | 7/2006 |
| JP | 2009-135865 A | 6/2009 |
| JP | 2009-147896 A | 7/2009 |
| JP | 2009-147901 A | 7/2009 |
| JP | 2010-177947 A | 8/2010 |
| JP | 2010-199758 A | 9/2010 |
| JP | 2011-037019 A | 2/2011 |
| JP | 2011-087280 A | 4/2011 |
| WO | 2012/172662 A1 | 12/2012 |

OTHER PUBLICATIONS

International Search Report issued in International Application No. PCT/JP2011/063728 dated Aug. 23, 2011.
http://www.exemode.com/yashica/dpf/dvf828.html, with partial translation, Jul. 10, 2013.
http://www.exemode.com/product-exe/scan/mfs-60.html, with partial translation, Jul. 10, 2013.
Office Action Chinese Patent Application No. 201180071603.5 dated Mar. 31, 2015.

* cited by examiner

SCANNER SYSTEM

RELATED APPLICATIONS

This application is the Continuation of International Application No. PCT/JP2011/063723, filed on Jun. 15, 2011, the disclosures of which Application is incorporated by reference herein.

BACKGROUND OF THE INVENTION

1. Field of the Invention

The present invention relates to a scanner system.

2. Description of the Related Art

In recent years, digitalization of a paper medium such as a circular notice, a leaflet or an advertising circular, a receipt, and a photograph by using a scanner device has been prevailing. In addition, multi-functional portable terminals such as a PDA (Personal Digital Assistant) and a smart phone have become popular, and a demand for using the digitized data in the portable terminals is increasing.

Fetching of the digitized data from the scanner device to the portable terminal is generally carried out through a personal computer and the like. However, for example, Japanese Patent Application Laid-open No. 2002-84348 discloses a technology in which transmission and reception of the digitized data are directly carried out between the scanner device and the portable terminal to increase convenience of a user of the portable terminal.

Here, in the data communication technology between the portable terminal and the scanner device of the related art, which is disclosed in Japanese Patent Application Laid-open No. 2002-84348 and the like, first, a user carries out various kinds of operations such as menu selection, and then the portable terminal and the scanner device are electrically connected to each other, whereby communication between the portable terminal and the scanner device is generally established. In this case, most of the operations which a user has to do are carried out using a user interface that is peculiar to each device, and thus it is necessary for the user to get familiar with the user interface to use the above-described technology. Accordingly, there is a concern that using of the above-described technology may cause a burden on a user.

SUMMARY OF THE INVENTION

It is an object of the present invention to at least partially solve the problems in the conventional technology. According to an aspect of the present invention, a scanner system comprises a portable terminal and a scanner device. The scanner system is configured in such a manner that when the portable terminal is mounted on a mounting portion of the scanner device, the portable terminal and the scanner device are electrically connected to each other.

The scanner device includes a device-side mounting detection unit that detects the mounting of the portable terminal on the mounting portion of the scanner device, an identification information acquisition unit that acquires identification information of the portable terminal when the mounting of the portable terminal on the mounting portion is detected by the device-side mounting detection unit, and a connection request unit that transmits a connection request to the portable terminal having the identification information acquired by the identification information acquisition unit.

The portable terminal includes a terminal-side mounting detection unit that detects the mounting of the portable terminal on the mounting portion of the scanner device, and an activation unit that activates an application for establishing communication with the scanner device in response to the connection request transmitted from the scanner device when the mounting of the portable terminal on the mounting portion is detected by the terminal-side mounting detection unit.

The communication between the portable terminal and the scanner device is established by the application of the portable terminal in response to the connection request transmitted from the scanner device.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
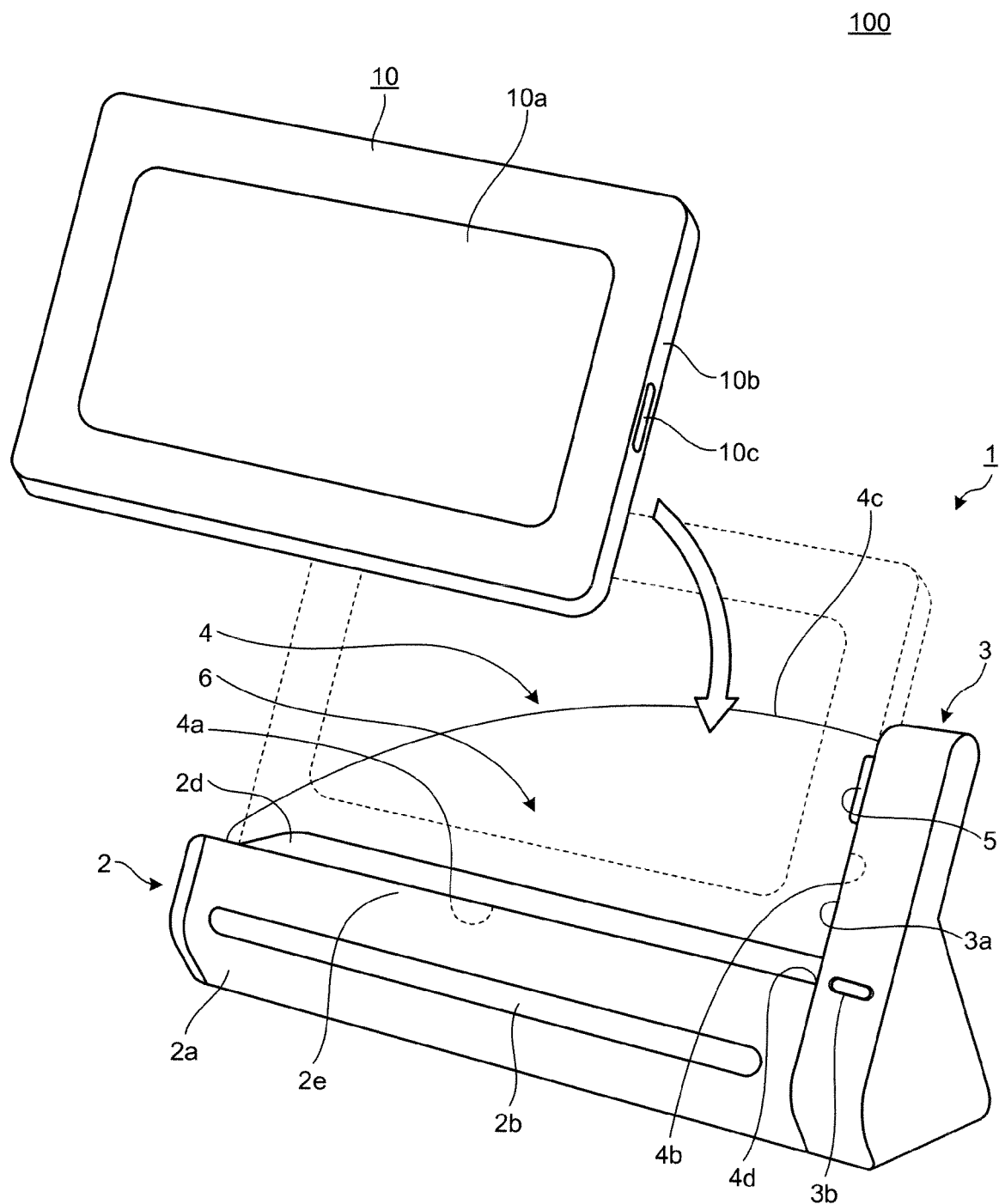
FIG. 1 is a front-side perspective view of a scanner system according to an embodiment of the invention.

Hereinafter, an embodiment of a scanner system according to the invention will be described with reference to the attached drawings. In addition, in the following drawings, the same reference numerals will be given to the same or corresponding portions, and redundant description thereof will not be repeated. In addition, in the following description, the vertical direction and the horizontal direction are intended to represent the vertical direction and the horizontal direction in FIG. 1 unless otherwise stated.

First, a configuration of a scanner system 100 according to an embodiment of the invention will be described with reference to FIGS. 1 and 2. FIG. 1 is a front-side perspective view of the scanner system 100 according to an embodiment of the invention, and FIG. 2 is a functional block diagram of the scanner system 100 illustrated in FIG. 1.

Figure 2:
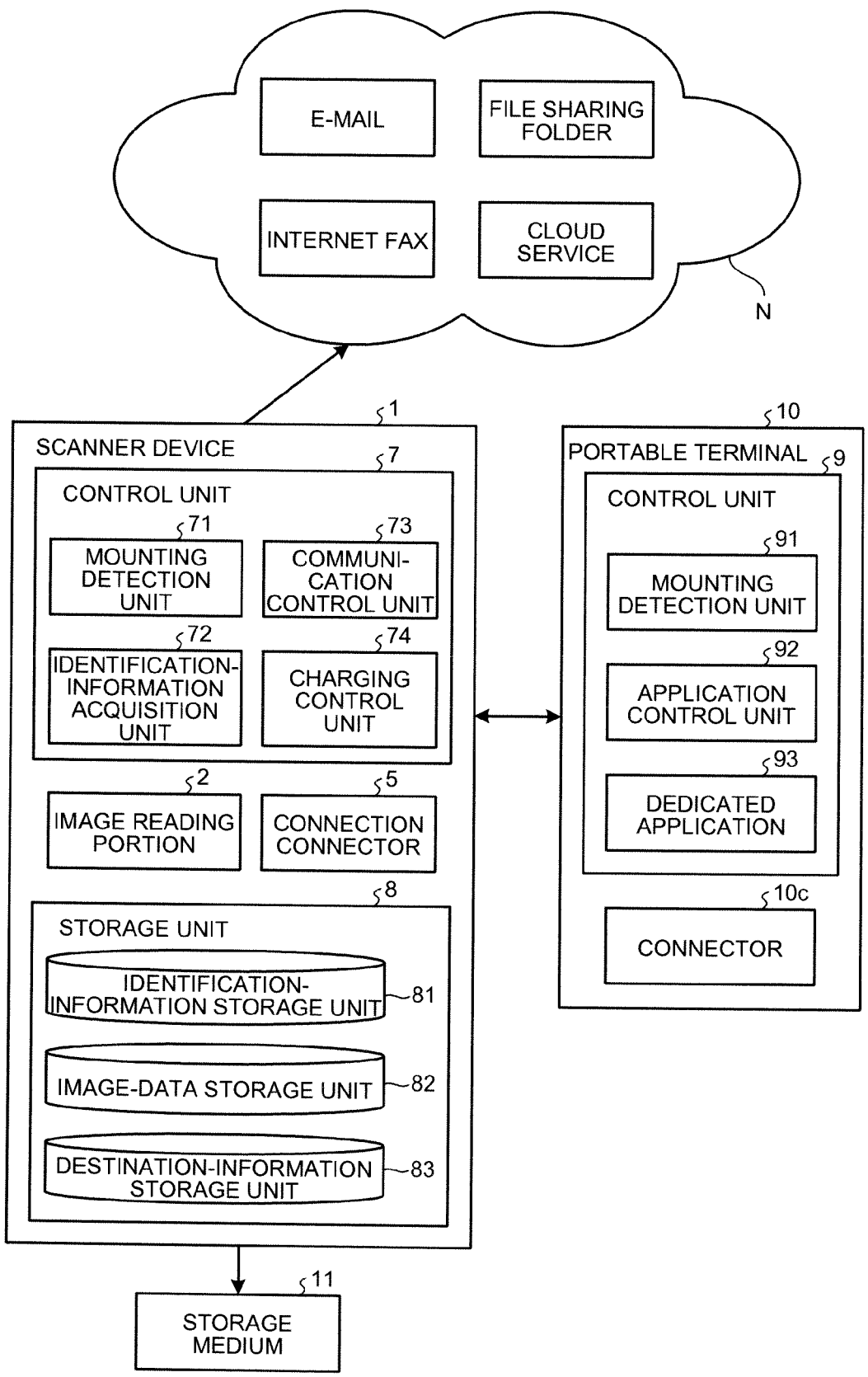
FIG. 2 is a functional block diagram of the scanner system illustrated in FIG. 1.

As illustrated in FIGS. 1 and 2, the scanner system 100 of this embodiment includes a scanner device 1 and a portable terminal 10, and is configured in such a manner that when the portable terminal 10 is integrally mounted on a mounting portion 6 of the scanner device 1, the portable terminal 10 and the scanner device 1 are electrically connected.

A configuration of the portable terminal 10 will be described. The portable terminal 10 is a multi-functional information terminal device such as a PDA (Personal Digital Assistant) or a smart phone. The portable terminal 10 is a terminal device of a type including a rectangular front surface, on most part of which a touch panel type display screen 10a is provided. The portable terminal 10 is configured such that the portable terminal 10 is used in a longitudinal or vertical state when it is used alone, and that the portable terminal 10 is turned to be a lateral or horizontal state when it is mounted on the scanner device 1. In addition, the portable terminal 10 includes a connector 10c for charging and/or communication, which is provided at the center of a lower end surface 10b (i.e., an end surface on one of short sides of a rectangular shape) when being used in the longitudinal state.

As illustrated in FIG. 2, the portable terminal 10 is provided with a control unit 9 that controls a connection process with the scanner device 1, and the like. The control unit 9 includes a mounting detection unit (a terminal-side mounting detection unit) 91, an application control unit (activation unit) 92, and a dedicated application 93.

The mounting detection unit 91 detects the mounting of the portable terminal 10 on the mounting portion 6 of the scanner device 1 from the portable terminal 10 side. More specifically, the mounting detection unit 91 may detect the mounting of the portable terminal 10 on the mounting portion 6 of the scanner device 1, for example, according a method to be exemplified below.

(1) The mounting detection unit 91 uses an acceleration sensor provided to the portable terminal 10 to detect that the portable terminal 10 is placed on the mounting portion 6 in a predetermined direction and at a predetermined angle.

(2) The mounting detection unit 91 detects turning ON of the magnet switches which are provided to the scanner device 1 and the portable terminal 10 at designated positions, respectively, and turn ON when the portable terminal 10 is mounted on the mounting portion 6.

(3) Wireless communication (infrared communication) function is provided to both of the portable terminal 10 and the scanner device 1 in a mounting direction on the mounting portion 6 (at positions opposite to each other when the portable terminal 10 is mounted on the mounting portion 6). The mounting detection unit 91 detects starting of infrared communication when the portable terminal 10 is mounted on the mounting portion 6.

(4) The mounting detection unit 91 detects communication which is a trigger to the portable terminal 10 by wireless communication (Bluetooth/Wifi) carried out when the portable terminal 10 is mounted on the mounting portion 6.

(5) The mounting detection unit 91 detects communication carried out which is a trigger to an IC card of the portable terminal 10 from an IC card reader on the scanner device 1 side.

The application control unit 92 controls various kinds of applications that are stored in the portable terminal 10. Particularly, in this embodiment, when mounting of the portable terminal 10 on the mounting portion 6 is detected by the mounting detection unit 91, the application control unit 92 activates the dedicated application 93 for the scanner device 1.

The dedicated application 93 is an application that is dedicated to a portable terminal carrying out various operations (an image reading process and an image data communication process) of the scanner device 1. The dedicated application 93 has a communication function with the scanner device 1, and storage, reading, and edition functions of image data acquired from the scanner device 1. A process of establishing communication with the scanner device 1 may be carried out using the dedicated application 93, for example, in response to a connection request transmitted from the scanner device 1. In addition, the dedicated application 93 may be downloaded from the scanner device 1 or a network server to the portable terminal 10 and installed in the portable terminal 10.

Here, the control unit 9 of the portable terminal 10 is an electronic circuit mainly constituted by a known microcomputer that physically includes a CPU (Central Processing Unit), a RAM (Random Access Memory), a ROM (Read Only Memory), and an interface. The functions of the control unit 9, which includes the mounting detection unit 91, the application control unit 92, and the dedicated application 93, are realized by loading an application program stored in the ROM to the RAM and by executing the application program by the CPU to allow various devices in the portable terminal 10 to operate under the control of the CPU, and to carry out reading-out and writing-in of data in the RAM or the ROM.

A configuration of the scanner device 1 will be described. The scanner device 1 includes an image reading portion 2, an arm portion 3, a panel portion 4, and a connection connector 5.

The image reading portion 2 has a scanner function of imaging, i.e., capturing image of a paper medium (document) that is an object to be read out, and of generating image data. The scanner function of the image reading portion 2 is a document conveying type, and in this embodiment, the main scanning direction of the scanner function is set to be approximately horizontal to an installation surface. As illustrated in FIG. 1, a paper feed port 2b that extends in a direction approximately horizontal to the installation surface is provided to a front surface portion 2a of a cover of the image reading portion 2. A document is introduced from the paper feed port 2b to the inside, a reading process is performed, and the read-out document is discharged from a paper discharge port (not illustrated) that is formed on a rear surface side of the image reading portion 2 similarly to the paper feed port. In addition, a conveying path converting cover (not illustrated) may be provided to the paper discharge port of the image reading portion 2 to convert a discharge direction of the document to an upper direction or a horizontal direction according to an opening and closing state thereof.

In addition, as illustrated in FIG. 1, an upper surface portion 2d is provided to an upper portion of the cover of the image reading portion 2. An upper end of the front surface portion 2a protrudes upwardly in relation to the upper surface portion 2d along the entire width direction to form an engagement portion 2e.

The arm portion 3 is a member that extends from one end of the image reading portion 2 in the main scanning direction to a direction perpendicular to the main scanning direction. In the example illustrated in FIG. 1, when viewed from the front side, the arm portion 3 extends upwardly in a direction perpendicular to the main scanning direction of the image reading portion 2 that is set to be horizontal to the installation surface from the right-side end of the image reading portion 2. Here, specifically, the "upward direction" is intended to represent an arbitrary direction between the vertically upward direction and the horizontal direction on a rear surface side of the scanner device 1. In the example illustrated in FIG. 1, the arm portion 3 extends by setting an obliquely upward direction that is inclined to the rear surface side of the scanner device 1 as a longitudinal direction.

The panel portion 4 is a board-shaped member that is connected to the image reading portion 2 and the arm portion 3 on opposed surfaces with the image reading portion 2 and the arm portion 3. In the example illustrated in FIG. 1, the upper surface portion 2d of the image reading portion 2 and a left-side surface 3a of the arm portion 3 are perpendicular to each other. A lower end surface 4a of the panel portion 4 is inserted into the upper surface portion 2d of the image reading portion 2, and a right end surface 4b of the panel portion 4 is inserted into the left-side surface 3a of the arm portion 3. The panel portion 4 is supported by the image reading portion 2 and the arm portion 3.

In addition, the panel portion 4 includes an inclined end surface 4c that is inclined from the upper end of the right end surface 4b, which is connected to the arm portion 3, toward a left end of the lower end surface 4a that is connected to the image reading portion 2. The inclined end surface 4c is formed to facilitate gripping the portable terminal 10 in a state in which the portable terminal 10 is mounted on the mounting portion 6, and to make the portable terminal 10 be easily attached to or detached from the scanner device 1. The shape of the inclined end surface 4c may be a straight line connecting the upper end of the right end surface 4b and the left end of the lower end surface 4a, a concave shape that is depressed in a direction of a corner 4d made by the right end surface 4b and the lower end surface 4a, or a convex shape that swells toward the opposite side as illustrated in FIG. 1.

As illustrated in FIG. 1, the connection connector 5 that may be connected to the connector 10c of the portable terminal 10 is provided to the left-side surface 3a of the arm portion 3 which faces the image reading portion 2. When being connected to the connector 10c of the portable terminal 10, the connection connector 5 electrically connects the scanner device 1 and the portable terminal 10 in order for the scanner device 1 and the portable terminal 10 to be able to perform communication, thereby establishing communication with the portable terminal 10. In addition, the connection connector 5 also functions as a charging unit of the portable terminal 10, and thus may supply power to a battery of the portable terminal 10 during connection to the portable terminal 10. In addition, as a power supply of the scanner device 1, an AC power supply, a battery, a solar cell, USB connection from a PC (personal computer), and the like may be applied.

In the scanner device 1, as illustrated in FIG. 1, the mounting portion 6 on which the portable terminal 10 may be mounted is formed by the image reading portion 2, the arm portion 3, and the panel portion 4. By mounting the portable terminal 10 on the mounting portion 6, the scanner device 1 may establish communication with the portable terminal 10 through the connection connector 5, and the portable terminal 10 and the scanner device 1 are configured integrally.

More specifically, the mounting portion 6 is configured to maintain the portable terminal 10 at a predetermined position by bringing the portable terminal 10 into contact with the image reading portion 2, the arm portion 3, and the panel portion 4 concurrently. In the example illustrated in FIG. 1, when the portable terminal 10 is brought into contact with the upper surface portion 2d of the image reading portion 2, the left-side surface 3a of the arm portion 3, and the panel portion 4 concurrently, movement of the portable terminal 10 to the front side is regulated by the engagement portion 2e of the image reading portion 2, and the rear surface of the portable terminal 10 is supported by the panel portion 4, and thus the portable terminal 10 may be disposed at a predetermined position on the mounting portion 6 with the same posture as indicated by a broken line in FIG. 1. In addition, the mounting portion 6 may be configured to arbitrarily adjust an angle or direction of the portable terminal 10 mounted thereon.

Furthermore, the connection connector 5 is disposed on the left-side surface 3a of the arm portion 3, so as to face the connector 10c of the portable terminal 10 and to be connected thereto, when the portable terminal 10 is disposed at the predetermined position indicated by the broken line in FIG. 1. Accordingly, when the portable terminal 10 is mounted on the mounting portion 6 at the predetermined position, the portable terminal 10 is connected to the connection connector 5 through the connector 10c in a wired manner, and thus communication with the scanner device 1 and charging can be made, and the portable terminal 10 is connected and fixed to the scanner device 1.

In this manner, when the portable terminal 10 is retained on the mounting portion 6 of the scanner device 1, since the portable terminal 10 and the scanner device 1 are electrically connected through the connector 10c and the connection connector 5, the scanner device 1 can use the display screen 10a of the portable terminal 10 as an operation screen of the scanner device 1 or a scanned image display screen. In this embodiment, as described above, since the dedicated application 93 of the portable terminal 10 is set to be activated when the portable terminal 10 is mounted on the mounting portion 6, the display screen 10a of the portable terminal 10 can be automatically used as the operation screen of the scanner device 1 through the dedicated application 93.

In addition, the image reading portion 2 may be configured as follows. In a case in which the portable terminal 10 is not mounted on the mounting portion 6, the image reading portion 2 is kept in a sleep mode, and when the portable terminal 10 is mounted on the mounting portion 6, and the image reading portion 2 is electrically connected to the portable terminal 10 by the connection connector 5, or when the mounting of the portable terminal 10 on the mounting portion 6 is detected by a mounting detection unit 71 to be described later, the image reading portion 2 is activated from the sleep mode.

Furthermore, as illustrated in FIG. 2, the scanner device 1 includes a control unit 7 and a storage unit 8. The control unit 7 includes the mounting detection unit (a device-side mounting detection unit) 71, an identification-information acquisition unit 72, a communication control unit (a connection request unit, a transmission unit) 73, and a charging control unit 74. The storage unit 8 includes an identification-information storage unit 81, an image-data storage unit 82, and a destination-information storage unit 83.

The mounting detection unit 71 detects mounting of the portable terminal 10 on the mounting portion 6 of the scanner device 1 from the scanner device 1 side. More specifically, the mounting detection unit 71 may detect the mounting of the portable terminal 10 on the mounting portion 6 of the scanner device 1, for example, according to the following methods.

(1) A load sensor is provided to the mounting portion 6, and a variation in an output of the load sensor is checked.

(2) An optical sensor (including infrared communication) is provided to the mounting portion 6, and a variation in a sensor output of the optical sensor is checked.

(3) Detection of an IC card of the portable terminal 10 is carried out by an IC card reader of the scanner device 1.

(4) A shape and a color of the portable terminal 10 are read out by a CCD camera in the vicinity of the mounting portion 6.

(5) A bar code attached to the portable terminal 10 is read out by a bar code reader of the scanner device 1.

When the mounting of the portable terminal 10 on the mounting portion 6 is detected by the mounting detection unit 71, the identification-information acquisition unit 72 acquires identification information of the portable terminal 10. More specifically, the identification-information acquisition unit 72 may acquire the identification information of the portable terminal 10, for example, by the following methods.

(1) An IC chip mounted in the portable terminal 10, or an IC card of a user is read out by an IC card reader to acquire identification information stored in the IC chip or the IC card.

(2) A bar code that is attached to the surface of the portable terminal 10, or that is displayed on the screen of the portable terminal 10 is read out by a bar code reader to acquire identification information.

(3) A voice produced by the dedicated application 93 on the portable terminal 10 or a voice of a user is collected by a microphone, and identification information that is correlated with the voice data is acquired from the identification-information storage unit 81.

(4) Infrared communication with the portable terminal 10 is carried out to acquire identification information.

(5) Fingerprints of a user of the portable terminal 10 are read out by a fingerprint sensor, and identification information that is correlated with the fingerprint information is acquired from the identification-information storage unit 81.

In addition, the identification information acquired by the above-described methods is stored in the identification-information storage unit 81 and is correlated with transmission setting information of image data.

(6) A shape (color, type) of the portable terminal 10 is read out by a CCD camera, and identification information correlated with this information is acquired from the identification-information storage unit 81.

The communication control unit 73 controls communication with the portable terminal 10. Specifically, the communication control unit 73 carries out a process of transmitting a connection request to the portable terminal 10, a process of establishing communication with the portable terminal 10, a process of transmitting image data, and the like.

The charging control unit 74 controls charging of a secondary battery of the portable terminal 10. More specifically, when the mounting of the portable terminal 10 on the mounting portion 6 is detected by the mounting detection unit 71, the charging control unit 74 supplies power to the portable terminal 10 that is electrically connected through the connection connector 5 of the scanner device 1 and the connector 10c of the portable terminal 10 to carry out charging.

Identification information of the portable terminal 10 or a user, and information of transmission destination are stored in the identification-information storage unit 81 in correlation with each other.

Image data, which is generated from an image reading process carried out by the image reading portion 2, is stored in the image-data storage unit 82.

Authentication information when an authentication process is carried out with respect to services on the Internet N such as an E-mail, an Internet FAX, a file sharing folder, and a cloud service, and destination information are stored in the destination-information storage unit 83 in correlation with each other.

In addition, the scanner device 1 may store the image data generated by the image reading portion 2, for example, in a storage medium 11 such as a USB storage or an SD memory card which are connected to the scanner device 1 as illustrated in FIG. 2 in addition to the portable terminal 10, or may transmit the data to services on the Internet N such as an E-mail, an Internet FAX, a file sharing folder, and a cloud service.

Here, the control unit 7 and the storage unit 8 of the scanner device 1 are electronic circuits mainly constituted by a known microcomputer that physically includes a CPU (Central Processing Unit), a RAM (Random Access Memory), a ROM (Read Only Memory), and an interface. The functions (i.e., the mounting detection unit 71, the identification-information acquisition unit 72, the communication control unit 73, and the charging control unit 74) of the control unit 7 are realized by loading an application program stored in the ROM to the RAM and by executing the application program by the CPU to allow various devices in the scanner device 1 to operate under the control of the CPU, and to carry out reading-out and writing-in of data in the RAM or the ROM. In addition, the storage unit 8 (the identification-information storage unit 81, the image-data storage unit 82, and the destination-information storage unit 83) are realized by the RAM or the ROM.

In addition, in FIG. 1, the configuration, in which the scanner device 1 and the portable terminal 10 are connected in a wired manner by the connection connector 5 of the scanner device 1 and the connector 10c of the portable terminal 10, has been illustrated. However, for example, the portable terminal 10 and the scanner device 1 may be configured to be connected by wireless communication instead of the connection connector 5 and the connector 10c to execute the communication function or the charging function as long as the scanner device 1 and the portable terminal 10 may be electrically connected. The expression "electrical connection" used in this embodiment represents a state in which communication between the scanner device 1 and the portable terminal 10 may be established, and includes not only a state in which both of the scanner device 1 and the portable terminal 10 are physically connected in a wired manner, but also a state in which both of these are substantially connected by wireless communication or the like.

Figure 3:
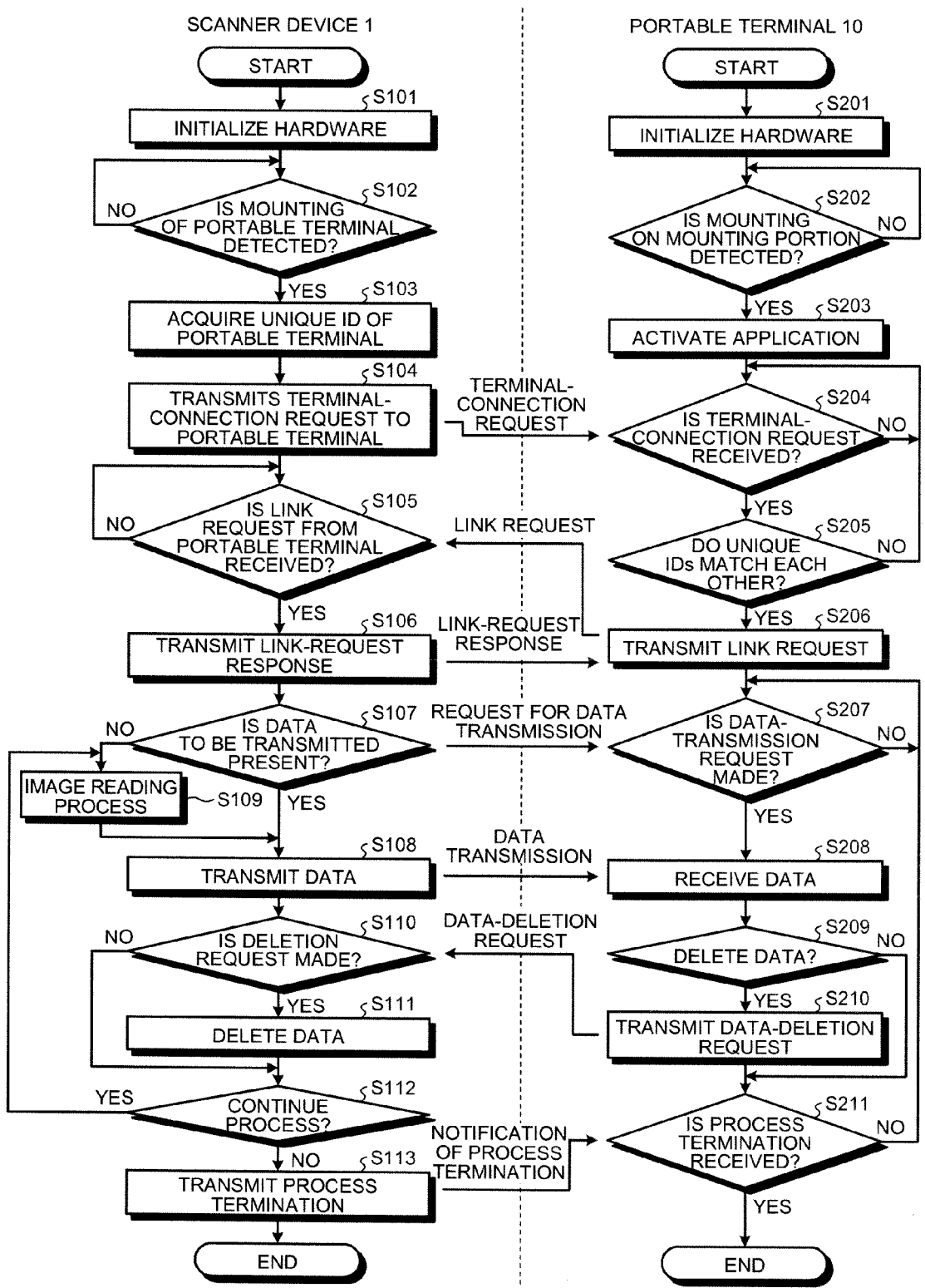
FIG. 3 is a sequence diagram illustrating a communication establishment process and an image data transmission process when a portable terminal is mounted on a mounting portion of a scanner device.
Figure 4:
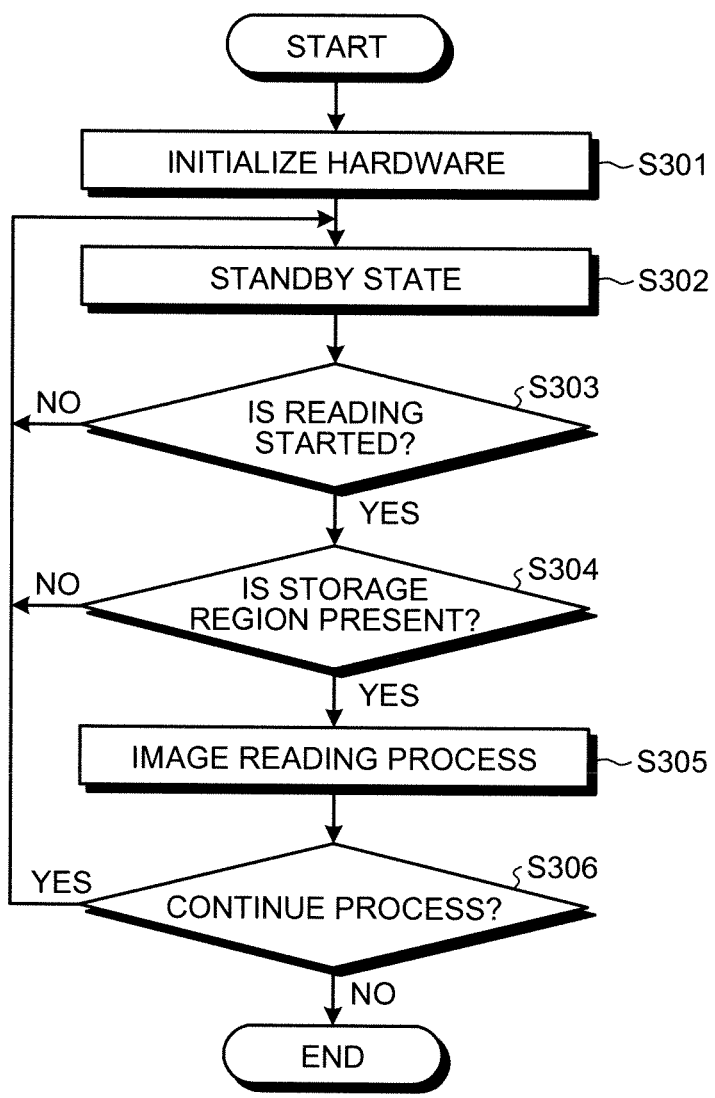
FIG. 4 is a flowchart illustrating an image reading process of the scanner device, which is carried out in a state in which the portable terminal is not mounted on the mounting portion of the scanner device.
Figure 5:
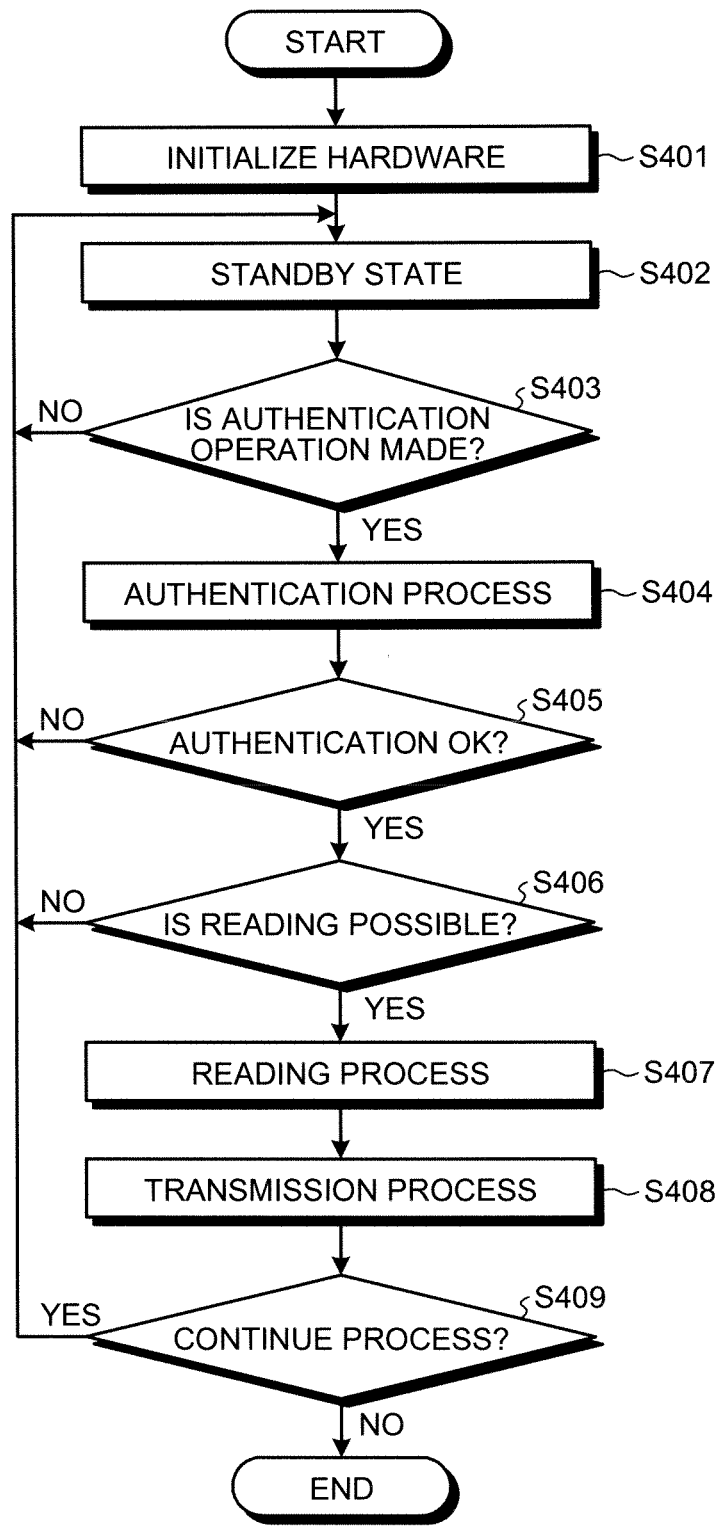
FIG. 5 is a flowchart illustrating a process of transmitting image data by the scanner device to a destination other than the portable terminal.

Next, an operation of the scanner system 100 according to this embodiment will be described with reference to FIGS. 3 to 5. FIG. 3 is a sequence diagram illustrating a communication establishment process and an image data transmission process when the portable terminal 10 is mounted on the mounting portion 6 of the scanner device 1. FIG. 4 is a flowchart illustrating an image reading process of the scanner device 1, which is carried out in a state in which the portable terminal 10 is not mounted on the mounting portion 6 of the scanner device 1. FIG. 5 is a flowchart illustrating a process of transmitting image data by the scanner device 1 to a destination other than the portable terminal 10.

First, the communication establishment process and the image data transmission process between the portable terminal 10 and the scanner device 1 will be described with reference to FIG. 3. The process illustrated in FIG. 3 is initiated when the scanner device 1 and the portable terminal 10 are powered on. In addition, the process illustrated in FIG. 3 represents a case in which the scanner device 1 and the portable terminal 10 are electrically connected by wireless communication.

In the scanner device 1, first, hardware is initialized (step S101), and whether or not the portable terminal 10 is mounted on the mounting portion 6 is confirmed by the mounting detection unit 71 (step S102). The scanner device 1 waits in step S102 until the mounting of the portable terminal 10 is detected, and transitions to step S103 when the mounting of the portable terminal 10 is detected. In addition, when the portable terminal 10 is mounted on the mounting portion 6, the scanner device 1 is electrically connected to the portable terminal 10, and enters a state in which communication is possible.

In step S102, when the mounting of the portable terminal 10 is detected, subsequently, a unique ID (identification information) of the portable terminal 10 mounted on the mounting portion 6 is acquired by the identification-information acquisition unit 72 (step S103). The identification-information acquisition unit 72 acquires the unique ID of the portable terminal 10 from another route without using a route (route used for communication establishment or the like) that is electrically connected to the portable terminal 10. For example, the unique ID may be directly acquired by the IC chip of the portable terminal 10 or by infrared communication, or the unique ID may be acquired from the identification-information storage unit 81 on the basis of information of the bar code of the portable terminal 10, the voice of a user, or the like.

Subsequently, a terminal-connection request is transmitted by the communication control unit 73 to the portable terminal 10 having the unique ID (step S104), and the process transitions to step S105. The communication control unit 73 acquires destination information from the identification-information storage unit 81 on the basis of the unique ID, and attaches information of the unique ID to the terminal-connection request, and then transmits the resultant terminal-connection request to the destination.

On the other hand, in the portable terminal 10, firstly, hardware is initialized (step S201), and whether or not the portable terminal 10 is mounted on the mounting portion 6 of the scanner device 1 is confirmed by the mounting detection unit 91 (step S202). The portable terminal 10 waits in step S202 until the mounting of the portable terminal 10 on the mounting portion 6 of the scanner device 1 is detected, and when the mounting of the portable terminal 10 on the mounting portion 6 is detected, the process transitions to step S203. In addition, when being mounted on the mounting portion 6 of the scanner device 1, the portable terminal 10 is electrically connected to the scanner device 1, and enters a state in which communication is possible. In addition, the portable terminal 10 may enters a state in which communication is possible when being powered on.

In step S202, when the mounting of the portable terminal 10 is detected, subsequently, the dedicated application 93 is activated by the application control unit 92 (step S203).

Whether or not the terminal-connection request is received from the scanner device 1 is confirmed by the dedicated application 93 (step S204). The portable terminal 10 waits in step S204 until reception of the terminal-connection request is confirmed, and when the terminal-connection request is received, the process transitions to step S205.

When the terminal-connection request is received, subsequently, whether or not the unique ID attached to the terminal-connection request matches a unique ID of the portable terminal is confirmed by the dedicated application 93 (step S205). In a case where the unique IDs match each other, it is determined that the terminal-connection request is transmitted to the portable terminal 10, a link request for establishing communication is transmitted (step S206). In addition, in a case where the unique IDs do not match each other, the process returns to step S204, and the portable terminal 10 waits until a new terminal-connection request is received.

Next, in the scanner device 1, whether or not the link request by the dedicated application 93 of the portable terminal 10 is received is confirmed by the communication control unit 73 (step S105). When the link request is received, a link-request response is transmitted to the portable terminal 10 by the communication control unit 73 (step S106). In addition, communication between the scanner device 1 and the portable terminal 10 is established in response to the reception of the link-request response to the portable terminal 10.

When communication between the scanner device 1 and the portable terminal 10 is established, whether or not image data that is not transmitted to the portable terminal 10 is stored in the image-data storage unit 82 is confirmed by the communication control unit 73 (step S107). In a case where data that is not transmitted is present, first, a data-transmission request is transmitted, and image data that is not transmitted is transmitted (step S108). In addition, in the process of transmitting the data that is not transmitted of step S108, all pieces of image data that is not transmitted may be automatically transmitted to the portable terminal 10. In addition, this transmission process may be manually carried out by confirmation and selection operations by a user by using a touch panel on the display screen 10a of the portable terminal 10, a button 3b of the scanner device 1, or the like.

In step S107, in a case where data that is not transmitted is not present, an image reading process is newly carried out by the image reading portion 2 (step S109), and image data that is newly generated is transmitted (step S108). In addition, the image reading process in step S109 is carried out in response to an operation input of a user by using the touch panel on the display screen 10a of the portable terminal 10, the button 3b of the scanner device 1, or the like.

Next, in the portable terminal 10, whether or not a data-transmission request is received from the scanner device 1 is confirmed by the dedicated application 93 (step S207). In a case where the data-transmission request is received, image data transmitted from the scanner device 1 is received by the dedicated application 93 (step S208), and the image data is stored in the storage region in the portable terminal 10. In a case where the data-transmission request is not received, the portable terminal 10 waits in step S207 until the request is received.

After the image data is received, subsequently, whether or not to delete original data of the received image data, which is stored in the image-data storage unit 82 of the scanner device 1, is confirmed by the dedicated application 93 (step S209). This determination is sequentially input by an operation of a user of the portable terminal 10, or is set in advance. In a case of a data deletion setting, a data-deletion request is transmitted to the scanner device 1 by the dedicated application 93 (step S210). In a case of a data not-deletion setting, the data-deletion request is not transmitted, and it transitions to step S211.

Next, in the scanner device 1, whether or not the data-deletion request is received from the portable terminal 10 is confirmed by the communication control unit 73 (step S110). In a case where the data-deletion request is received, the original data that is stored in the image-data storage unit 82 is deleted (step S111). In a case where the data-deletion request is not received, the process transitions to step S112 while keeping the image data stored in the image-data storage unit 82 as is.

Subsequently, whether or not to continue the process is confirmed by the communication control unit 73 (step S112), in a case of continuing the process, the process returns to step S109, and a new image reading process is carried out by the image reading portion 2, and the resultant new image data is transmitted to the portable terminal 10. In a case of not continuing the process, a process-termination notification is transmitted to the portable terminal 10 by the communication control unit 73 (step S113). The scanner device 1 may be configured as follows. After the process-termination notification is transmitted, the scanner device 1 transitions to, for example, the sleep mode, and when an operation input (the button 3b or the display screen 10a of the portable terminal 10) by a user is made, or a request is made by the dedicated application 93 of the portable terminal 10, the processes from step S102 are restarted. In addition, the scanner device 1 may be configured to terminate communication with the portable terminal 10 when the portable terminal 10 is detached from the mounting portion 6 (for example, the detachment is detected by the mounting detection unit 71).

On the other hand, in the portable terminal 10, whether or not the process-termination notification is received from the scanner device 1 is confirmed by the dedicated application 93 (step S211). The portable terminal 10 may be configured as follows. In a case where the process-termination notification is received (Yes in S211), for example, the portable terminal 10 maintains communication with the scanner device 1. When a communication termination operation is made by the dedicated application 93, or when the portable terminal 10 is detached from the mounting portion 6 of the scanner device 1 (for example, the detachment is detected using an acceleration sensor or the like), communication with the scanner device 1 is terminated. In addition, the portable terminal 10 may be configured to terminate communication with the scanner device 1 when the process-termination notification is received.

In step S211, in a case where the process-termination notification is not received (NO in S211), the process returns to step S207, and the portable terminal 10 waits until a new data-transmission request is received from the scanner device 1.

In addition, for example, in a case where the process illustrated in FIG. 3 is applied to a configuration in which the scanner device 1 and the portable terminal 10 are connected in a wired manner through the connection connector 5 of the scanner device 1 and the connector 10c of the portable terminal 10 as illustrated in FIG. 1, since the portable terminal 10 that is electrically connected to the scanner device 1 in a wired manner may be clearly specified, among the processes illustrated in FIG. 3, the process of specifying the portable terminal 10 by using the unique ID of the portable terminal 10 such as steps S103 and S205 may be omitted.

Even in a state in which the portable terminal 10 is not mounted on the mounting portion 6, the scanner device 1 of this embodiment accumulates image data, and may transmit this data during communication establishment with the portable terminal 10. An image reading process of the scanner device 1 in a case where the portable terminal 10 is not mounted on the mounting portion 6 will be described with reference to FIG. 4. The process illustrated in FIG. 4 is started when the scanner device 1 is powered on.

First, hardware is initialized (step S301), and the scanner device 1 enters a standby state until an operation input of a user by using, for example, the button 3b or the like is made with respect to the scanner device 1 (step S302).

In a case where the operation input by a user is made, it is confirmed whether or not the content of the operation input is a reading-start operation of an image reading process (step S303). In a case where the content is the reading-start operation, the process transitions to S304. In a case where the content is not the reading-start operation, the process returns to step S302, and enters the standby state again.

In step S303, in a case where the reading-start operation is made, it is confirmed whether or not a storage region sufficient for storing image data, which is generated when the image reading process is carried out by the image reading portion 2, may be secured in the image-data storage unit 82 (step S304). In a case where the storage region is present in the image-data storage unit 82, the image reading process is carried out by the image reading portion 2 (step S305), and image data that is generated is accumulated in the image-data storage unit 82. On the other hand, in a case where the storage region is not present in the image-data storage unit 82, the process returns to step S302 without carrying out the image reading process, and enters a standby state again.

After the image reading process is carried out, whether or not to continue the process is confirmed by the image reading portion 2 (step S306). In a case of continuing the process, the process returns to step S302, and the scanner device 1 enters a standby state until the operation input is made again. In a case of not continuing the process, the process is terminated as is.

In addition, the accumulation of the image data, which is generated in the image reading process, in the image-data storage unit 82 in this way may be carried out even in a situation in which the portable terminal 10 is mounted on the mounting portion 6 of the scanner device 1.

Further, in addition to the transmission of the image data to the portable terminal 10 mounted on the mounting portion 6, for example, as illustrated in FIG. 2, the scanner device 1 of this embodiment may store the data in the storage medium 11 such as a USB storage and an SD memory card which are connected to the scanner device 1, or may transmit data to an external destination in various types such as transmission of the data to services on the Internet N such as an E-mail, an Internet FAX, a file sharing folder, and a cloud service. A process of transmitting data to an external destination will be described with reference to FIG. 5. The process illustrated in FIG. 5 is started when the scanner device 1 is powered on.

First, hardware is initialized (step S401), and the scanner device 1 enters a standby state until an operation input of a user by using, for example, the button 3b or the like is made with respect to the scanner device 1 (step S402).

In a case where the operation input by a user is made, whether or not the content of the operation input is "an authentication operation for transmitting the image data to the external destination" is confirmed by the image reading portion 2 (step S403). In a case where the operation input is the authentication operation, an authentication process is carried out (step S404). Specifically, the authentication process is a process of fetching destination information from the destination-information storage unit 83, which is in connection with the identification-information storage unit 81, with regard to a destination designated by a user operation, and of obtaining authentication from the destination. The authentication process uses authentication information supplied from a user by reading-out of an IC card or a bar code, voice recognition, fingerprint authentication, infrared communication, and the like. On the other hand, in a case where the operation input is not the authentication operation, the process returns to step S402, and the scanner device 1 enters a standby state again.

Subsequently, it is confirmed whether or not a result of the authentication process is OK (step S405). When the authentication result is OK, i.e., authentication is obtained, the process transitions to step S406. On the other hand, the authentication result is NG, i.e., authentication is not obtained, the process returns to step S402 without carrying out a process of transmitting data to the destination, and the scanner device 1 enters a standby state again.

In step S405, in a case where the authentication result is OK, first, whether or not the image reading process can be carried out by the image reading portion 2 is confirmed by the image reading portion 2 (step S406). In a case where it is determined that the image reading process can be carried out, the image reading process is carried out by the image reading portion 2 (step S407). In a case where it is determined that the image reading process is impossible, the process returns to step S402 without carrying out the image reading process, and the scanner device 1 enters a standby state again.

In addition, after carrying out the image reading process, the image data that is generated is transmitted to an external destination by the communication control unit 73 (step S408).

After transmitting the image data, whether or not to continue the process is confirmed by the image reading portion 2 (step S409). In a case of continuing the process, the process returns to step S402, and the scanner device 1 enters a standby state until the operation input is made again. In a case of not continuing the process, the process is terminated as is.

Next, an effect of the scanner system 100 according to this embodiment will be described.

The scanner system 100 of this embodiment includes the portable terminal 10 and the scanner device 1. The scanner system 100 is configured in such a manner that when the portable terminal 10 is mounted on the mounting portion 6 of the scanner device 1, the portable terminal 10 and the scanner device 1 are electrically connected to each other. The portable terminal 10 includes the mounting detection unit 91 that detects the mounting of the portable terminal 10 on the mounting portion 6 of the scanner device 1, and the application control unit 92 that activates the dedicated application 93 for establishing communication with the scanner device 1 in response to a connection request transmitted from the scanner device 1 when the mounting of the portable terminal 10 on the mounting portion 6 is detected by the mounting detection unit 91. The scanner device 1 includes the mounting detection unit 71 that detects the mounting of the portable terminal 10 on the mounting portion 6 of the scanner device 1, the identification-information acquisition unit 72 that acquires identification information (unique ID) of the portable terminal 10 when the mounting of the portable terminal 10 on the mounting portion 6 is detected by the mounting detection unit 71, and the communication control unit 73 that transmits the connection request to the portable terminal 10 having the identification information acquired by the identification-information acquisition unit 72. In addition, the dedicated application 93 of the portable terminal 10 establishes communication between the portable terminal 10 and the scanner device 1 in response to the connection request transmitted from the scanner device 1.

According to this configuration, in response to the mounting of the portable terminal 10 on the mounting portion 6 of the scanner device 1, in the portable terminal 10, the dedicated application 93 is activated, and a preparation is made for establishment of communication in response to the connection request transmitted from the scanner device 1. On the other hand, in the scanner device 1, identification information of the portable terminal 10 mounted on the mounting portion 6 is acquired, and a connection request is transmitted to the portable terminal 10 having the identification information. In addition, communication between the portable terminal 10 and the scanner device 1 is established by the dedicated application 93 of the portable terminal 10 which has received the connection request from the scanner device 1. Accordingly, the portable terminal 10 mounted on the mounting portion 6 is specified by only mounting the portable terminal 10 on the mounting portion 6 of the scanner device 1, and a process of establishing communication between the portable terminal 10 and the scanner device 1 may be automatically carried out. In this manner, in the scanner system 100 of this embodiment, communication between the portable terminal 10 and the scanner device 1 may be established without operation of a user.

In addition, in the scanner system 100 of this embodiment, the scanner device 1 includes the image-data storage unit 82 that stores image data generated by performing an image reading process. The communication control unit 73 of the scanner device 1 transmits the image data stored in the image-data storage unit 82 to the portable terminal 10 in which communication is established by the connection request.

According to this configuration, even in a state in which the portable terminal 10 is not connected to the scanner device 1, since the image reading process may be carried out by the scanner device 1, and image data that is generated may be accumulated, the image data may be quickly provided to the portable terminal 10 when communication between the portable terminal 10 and the scanner device 1 is actually possible. In addition, the same image data may be provided to a plurality of portable terminals. In this way, a process of transmitting the image data generated by the scanner device 1 to the portable terminal 10 may be effectively carried out.

In addition, in the scanner system 100 of this embodiment, when receiving a deletion command from the portable terminal 10 in which communication is established, the image-data storage unit 82 deletes the image data that is stored in the image-data storage unit 82. According to this configuration, the image data that is stored in the image-data storage unit 82 may be appropriately deleted, and thus a storage region may be secured. In addition, the image data may be stored in the image-data storage unit 82 before receiving the deletion command, and thus the same image data may be sequentially provided to the plurality of portable terminals.

Hereinbefore, the preferred embodiment of the invention has been described, but the invention is not limited to this embodiment. In the above-described embodiment, the image data that is generated by the image reading portion 2 of the scanner device 1 is stored in the image-data storage unit 82 inside the scanner device 1. However, it may be configured in such a manner that the image data is stored, for example, in external storage means such as a database on a cloud.

In the scanner system according to the invention, in accordance with the mounting of the portable terminal on the mounting portion of the scanner device, in the portable terminal, an application that establishes communication with the scanner device is activated in response to a connection request transmitted from the scanner device, and preparation is made for establishment of communication in response to the connection request transmitted from the scanner device. On the other hand, in the scanner device, identification information of the portable terminal mounted on the mounting portion is acquired, and a connection request is transmitted to the portable terminal having the identification information. In addition, communication between the portable terminal and the scanner device is established by an application of the portable terminal which has received the connection request from the scanner device. Accordingly, the portable terminal mounted on the mounting portion is specified by only mounting the portable terminal on the mounting portion of the scanner device, and a process of establishing communication between the portable terminal and the scanner device may be automatically carried out. In this manner, the scanner system according to the invention has an effect of establishing communication between the portable terminal and the scanner device without operation of a user.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanner system, comprising:
    a portable terminal; and
    a scanner device,
    wherein the scanner system is configured in such a manner that when the portable terminal is mounted on a mounting portion of the scanner device, the portable terminal and the scanner device are electrically connected to each other,
    the scanner device includes, a device-side mounting detection unit that detects mounting of the portable terminal on the mounting portion of the scanner device, an identification information acquisition unit that acquires identification information of the portable terminal when the mounting of the portable terminal on the mounting portion is detected by the device-side mounting detection unit, and a connection request unit that transmits a connection request to the portable terminal having the identification information acquired by the identification information acquisition unit, and the portable terminal includes, a terminal-side mounting detection unit that detects mounting of the portable terminal on the mounting portion of the scanner device, and an activation unit that activates an application for establishing communication with the scanner device in response to the connection request transmitted from the scanner device when the mounting of the portable terminal on the mounting portion is detected by the terminal-side mounting detection unit, wherein the communication between the portable terminal and the scanner device is established by the application of the portable terminal in response to the connection request transmitted from the scanner device.

2. The scanner system according to claim 1, wherein the scanner device further includes, an image data storage unit that stores image data generated by performing an image reading process, and a transmission unit that transmits the image data, which is stored in the image data storage unit, to the portable terminal with which communication is established by the connection request.

3. The scanner system according to claim 2, wherein the image-data storage unit is configured to delete the image data stored in the image-data storage unit when the image-data storage unit receives a deletion instruction from the portable terminal with which the communication is established.

* * * * *